US012246702B2

(12) United States Patent
Bolta et al.

(10) Patent No.: US 12,246,702 B2
(45) Date of Patent: Mar. 11, 2025

(54) METHOD, CONTROL DEVICE AND SYSTEM FOR STABILIZING A VEHICLE

(71) Applicant: ZF Friedrichshafen AG, Friedrichshafen (DE)

(72) Inventors: Axel Bolta, Friedrichshafen (DE); Michael Beller, Rot an der Rot-Haslach (DE)

(73) Assignee: ZF Friedrichshafen AG, Friedrichshafen (DE)

(*) Notice: Subject to any disclaimer, the term of this patent is extended or adjusted under 35 U.S.C. 154(b) by 552 days.

(21) Appl. No.: 17/607,972

(22) PCT Filed: Mar. 5, 2020

(86) PCT No.: PCT/EP2020/055788
§ 371 (c)(1),
(2) Date: Nov. 1, 2021

(87) PCT Pub. No.: WO2020/224826
PCT Pub. Date: Nov. 12, 2020

(65) Prior Publication Data
US 2022/0266817 A1 Aug. 25, 2022

(30) Foreign Application Priority Data
May 9, 2019 (DE) .................. 10 2019 206 738.7

(51) Int. Cl.
*B60W 40/114* (2012.01)
*B60W 10/119* (2012.01)
(Continued)

(52) U.S. Cl.
CPC ........ *B60W 30/045* (2013.01); *B60W 10/119* (2013.01); *B60W 10/20* (2013.01);
(Continued)

(58) Field of Classification Search
CPC .. B60W 30/045; B60W 10/119; B60W 10/20; B60W 10/22; B60W 30/04;
(Continued)

(56) References Cited

U.S. PATENT DOCUMENTS 6,092,815 A * 7/2000 Rutz ............... B60G 17/018
280/5.506
2005/0067213 A1* 3/2005 Yasui ............... B60G 21/0555
180/443

FOREIGN PATENT DOCUMENTS

DE 10 2009 007 357 A1 8/2010
EP 0 919 408 A1 6/1999

OTHER PUBLICATIONS

An Integrated Control of Differential Braking, Front/Rear Traction, and Active Roll Moment for Limit Handling Performance (Year: 2016).*

(Continued)

Primary Examiner — Harry Y Oh
(74) Attorney, Agent, or Firm — Finch & Maloney PLLC

(57) ABSTRACT

A method for stabilizing a vehicle (100) in which the vehicle (100) has a roll stabilizer (120), which is designed to stabilize a first axle (101) and a second axle (102) as a function of a roll torque distribution between the first axle (101) and the second axle (102). The method comprises a step of determining a sideslip angle index from a difference between a transverse acceleration calculated from a yaw rate of the vehicle (100) and a speed of the vehicle (100), and a detected transverse acceleration of the vehicle (100). The sideslip angle index is related to a sideslip angle of the vehicle (100). The method also comprises a step of generating a control signal (160) using the sideslip angle index. The control signal (160) is suitable for adjusting the roll
(Continued)

torque distribution of the roll stabilizer (120) as a function of the determined sideslip angle index.

10 Claims, 2 Drawing Sheets

(51) Int. Cl.
*B60W 10/20* (2006.01)
*B60W 10/22* (2006.01)
*B60W 30/04* (2006.01)
*B60W 30/045* (2012.01)
*B60W 40/105* (2012.01)

(52) U.S. Cl.
CPC ............ *B60W 10/22* (2013.01); *B60W 30/04* (2013.01); *B60W 40/105* (2013.01); *B60W 40/114* (2013.01); *B60W 2520/20* (2013.01); *B60W 2710/22* (2013.01); *B60W 2720/20* (2013.01); *B60W 2720/40* (2013.01)

(58) Field of Classification Search
CPC ............. B60W 40/105; B60W 40/114; B60W 2520/20; B60W 2710/22; B60W 2720/20; B60W 2720/40; B60W 2510/207; B60W 2520/10; B60W 2520/125; B60W 2520/14; B60W 2710/182; B60W 2710/207; B60W 40/101; B60W 40/103; B60W 40/109; B60W 30/02; B60W 2030/043

See application file for complete search history.

(56) References Cited

OTHER PUBLICATIONS

Development and Experimental Evaluation of A Slip Angle Estimator for Vehicle Stability Control (Year: 2006).*
Her Jyundong et al., "An Integrated Control of Differential Braking, Front/Rear Traction, and Active Roll Moment for Limit Handling Performance", IEEE Transactions on Vehicular Technology, IEEE Service Center, Piscataway, NJ, US, Bd. 65, Nr. 6, Jun. 1, 2016, pp. 4288-4300.
Damrongrit (Neng) Piyabongkarn et al., "Development and Experimental Evaluation of a Slip Angle Estimator for Vehicle Stability Control", IEEE Transactions on Control Systems Technology, IEEE Service Center, New York, NY, US, Bd. 16, Nr. 1, Jan. 1, 2009, pp. 78-88.
International Search Report Corresponding to PCT/EP2020/055788 mailed Jun. 8, 2020.
Written Opinion Corresponding to PCT/EP2020/055788 mailed Jun. 8, 2020.

* cited by examiner

METHOD, CONTROL DEVICE AND SYSTEM FOR STABILIZING A VEHICLE

This application is a National Stage completion of PCT/EP2020/055788 filed Mar. 5, 2020, which claims priority to German application serial no. 10 2019 206 738.7 filed May 9, 2019.

FIELD OF THE INVENTION

The present invention relates to a method for stabilizing a vehicle, to a corresponding control unit, and to a system for stabilizing a vehicle.

BACKGROUND OF THE INVENTION

A system that influences the behavior of a vehicle is, for example, the so-termed electronic stability program (ESP). The ESP can influence the vehicle's behavior by actuating the individual wheel brakes, so that a vehicle speed can be reduced. The so-termed ERC (electro-mechanical roll control) achieves influence over the vehicle's behavior by displacing a roll torque of a vehicle body and the wheel contact forces resulting therefrom.

Furthermore, DE 10 2009 007 357 A1 relates to a method for controlling an active chassis of a two-axle, two-track motor vehicle.

SUMMARY OF THE INVENTION

Against that background, the present invention provides an improved method for stabilizing a vehicle, an improved control unit and an improved system for stabilizing a vehicle, in accordance with the principal claims. Advantageous design features emerge from the subordinate claims and from the description that follows.

According to embodiments, in particular, a control or regulation of an electronic or electro-mechanical roll stabilizer for a vehicle can be realized in order to influence the yaw behavior of the vehicle by dynamic adaptation of the chassis properties, using the roll stabilizer. More accurately expressed, it is possible for example for an adjustable roll stabilizer to be controlled, in such a manner, that a roll torque is distributed or displaced dynamically between the front and rear axles. In that way, in particular, the wheel contact forces can be displaced in a defined manner whereby the yaw behavior of the vehicle can be influenced. From a deviation between a calculated transverse acceleration and a measured or detected transverse acceleration, for example, a sideslip angle index can be determined, as a function of which a roll torque distribution of the roll stabilizer is adjusted or can be displaced between the front axle and the rear axle.

Advantageously, according to embodiments, the use of an active stabilizer, in particular for stabilizing a vehicle in oversteering and understeering situations, can be carried out with the help of sideslip angle detection. Advantageously, the yaw behavior of the vehicle can, in particular, be damped or boosted in various driving situations even without the use of another stabilizing device. Oversteering behavior of the vehicle, which can be regarded as safety-critical in a mass-produced road vehicle, can be influenced in various drive-dynamics situations and their environmental effects, such as loading, tire condition, road condition, steering behavior and acceleration. Otherwise expressed, an advantageous influence on the yaw behavior of the vehicle can be achieved by dynamic adaptation of chassis properties by virtue of appropriate control of an electro-mechanical stabilizer. In this, for example, brake and tire wear during the process of stabilization can also be avoided.

A method for stabilizing a vehicle is proposed, in which vehicle there is a roll stabilizer designed to stabilize a first axle and a second axle as a function of a roll torque distribution between the first axle and the second axle, wherein the method comprises a step of determining a sideslip angle index from a difference between a transverse acceleration of the vehicle calculated from a yaw rate of the vehicle and a speed of the vehicle and a measured transverse acceleration of the vehicle, wherein the sideslip angle index is related to a sideslip angle of the vehicle, and a step of generating a control signal using the sideslip angle index, wherein the control signal is suitable for adjusting the roll torque distribution of the roll stabilizer as a function of the determined sideslip angle index.

The vehicle can be a motor vehicle for conveying passengers and/or goods, in particular a passenger car, a truck or some other utility vehicle. For the stabilization of the first axle and the second axle, the roll stabilizer can be designed to exert forces that depend on the control signal on the respective wheel suspensions associated with the said axles. The roll torque distribution can define a distribution of the forces that can be exerted by the roll stabilizer on wheel suspensions of the first axle and the second axle. The first axle can be a front axle of the vehicle. The second axle can be a rear axle of the vehicle. The yaw rate and the speed can be measured by means of measuring devices. The transverse acceleration can be detected by a detection device. The method can be carried out by means of a control unit, or more precisely by means of suitable devices of a control unit. Depending on the sideslip angle index and the speed of the vehicle, the control signal can be generated as a correction factor for the roll torque distribution. Using the control signal, the roll torque distribution can be adjusted using an adjustment specification. For example, a current roll torque distribution can be changed using the control signal or the roll torque distribution can be set using the control signal. In that way, an overall supporting torque on the rear axle and the front axle can be cyclically redistributed, in order to ensure both continuity and stability in highly dynamic and complex driving situations.

According to an embodiment, the control signal can be generated in order to establish a time variation of the roll torque distribution. In this case, the determination step and the generating step can be repeatedly carried out and, in addition or alternatively, continuously. Such an embodiment has the advantage that the vehicle can be reliably stabilized and in a manner appropriate for the situation.

In this case, the control signal produced in the generating step can be suitable for setting the time variation of the roll torque distribution in such a manner that, starting from a default value, the time variation increases to a maximum value which is maintained for an adjustable time period and then decreases again to the said default value. The default value can, for example, represent a distribution of the wheel contact forces between the front and rear axles specified for a normal driving situation. The maximum value can represent a distribution of the wheel contact forces between the front and rear axles specified for a critical driving situation. For example, the maximum value can define a maximum obtainable displacement of the wheel contact forces starting from a distribution of the wheel contact forces defined by the default value. The maximum value can also be a maximum value obtained from a current driving dynamics regulation. The time period, for which the maximum value is maintained, can be set once and for all at a fixed duration for a vehicle, or, for example, continuously adapted using a teach-in process, for example, having regard to the driving behavior of a driver of the vehicle. Such an embodiment has the advantage that the vehicle can be stabilized in a robust manner.

The sideslip angle index can correspond to the sideslip angle or to a time variation of the sideslip angle. Alternatively, the sideslip angle index can be a variable derived from the sideslip angle. Otherwise expressed, the sideslip angle index can stand in a known or defined relationship to the sideslip angle. The time variation of the sideslip angle can also be regarded as a change of the sideslip angle as a function of time. The sideslip angle index can be determined from the change of the sideslip angle as a function of time. In that case, an absolute value of the sideslip angle can be used for determining the sideslip angle index. Such an embodiment has the advantage that there is no need for a complex determination of the sideslip angle, and yet a reliable stabilization of the vehicle can be achieved.

Furthermore, the method can include a step of generating the control signal for output to an interface with the roll stabilizer or with the roll stabilizer and at least one further driving dynamics regulating device. In that case, the at least one further driving dynamics regulating device can be an active damping device, an active suspension device, a steering device for the first axle and, additionally or alternatively, for the second axle, an axle transverse lock, a dynamic all-wheel drive, a switchable coupling rod, an active ball joint and, in addition or alternatively, suchlike devices. Such an embodiment has the advantage that the stabilization of the vehicle can be achieved in a reliable and robust manner by means of existing devices, in particular by means of the roll stabilizer or, in addition to the roll stabilizer, by means of the at least one further drive dynamics regulating device.

Moreover, the method can comprise a step of calculating the transverse acceleration of the vehicle as the product of a measured yaw rate of the vehicle and a measured speed of the vehicle, in order to obtain the calculated transverse acceleration. In this case, the calculated transverse acceleration can represent a reference transverse acceleration during a steady-state circular trajectory without a transverse acceleration that occurs with a sideslip angle. Such an embodiment has the advantage that a simple and quickly calculated reference value can be provided so that, in the determination step, computing resources can be saved.

The method can also comprise a step of reading-in the transverse acceleration of the vehicle, from a detection device, in order to provide the detected transverse acceleration. In the reading-in step, the measured yaw rate and the measured speed of the vehicle can also be read in from respective measurement devices. Such an embodiment has the advantage that, in particular, the actual transverse acceleration can be supplied reliably and accurately.

The approach presented here also provides for a control unit designed to carry out, control or implement the steps of a variant of the method presented here, by means of appropriate devices. In this embodiment too, in the form of a control unit, the objective of the invention can be achieved quickly and efficiently.

For that purpose, the control unit can comprise a computer unit for processing signals or data, at least one memory unit for storing signals or data, at least one interface with a sensor or an actor for reading-in sensor signals from the sensor or for emitting control signals to the actor, and/or at least one communications interface for reading-in or for sending out data, which are embedded in a communications protocol.

The computer unit can be, for example, a signal processor, a microcontroller or the like, while the memory unit can be a flash-memory, an EEPROM or a magnetic memory unit. The communications interface can be designed to read in or send out data by wireless or conductor-dependent means, wherein a communications interface which can read in or send out data by way of conductor means can, for example, read in such data electrically or optically via a corresponding data transmission line or send out such data via a corresponding data transmission line.

In the present context, a control unit can mean an electrical unit, which processes sensor signals and as a function of them emits control and/or data signals. The control unit can have an interface, which can be of hardware or software design. With a hardware design the interfaces can, for example, be part of a so-termed ASICs system, which incorporates the most varied functions of the control unit. However, it is also possible for the interfaces to consist of separate integrated circuits or to consist at least in part of discrete structural elements. With a software design, the interfaces can be software modules which, for example, are present in a microcontroller along with other software modules.

A system for stabilizing a vehicle is also proposed, wherein the system comprises a roll stabilizer designed to stabilize a first axle and a second axle of the vehicle as a function of a roll torque distribution between the said first axle and second axle, and comprises also an embodiment of the above-described control unit, such that the control unit is or can be connected to the roll stabilizer for the purpose of transmitting signals. In the system an embodiment of the aforesaid control unit can advantageously be included or used in order to control the roll stabilizer by way of the control signals.

According to an embodiment, the system can also comprise at least one further drive dynamics regulating device. In that case, the control unit is or can be connected for signal transmission purposes to the at least one further drive dynamics regulating device. The at least one further drive dynamics regulating device can be a damper device, an active suspension device, a steering device for the first axle and in addition or alternatively for the second axle, an axle transverse lock, a dynamic all-wheel drive, a switchable coupling rod, an active ball joint and, additionally or alternatively, the like. Such an embodiment has the advantage that depending on its existing equipment, the vehicle can be stabilized either particularly simply by means of the roll stabilizer, or stabilized in a particularly robust manner, in addition to the roll stabilizer, also by means of the said at least one further drive dynamics regulating device.

BRIEF DESCRIPTION OF THE DRAWINGS

The invention will be explained in greater detail, as an example, with reference to the attached drawings, which show.

DETAILED DESCRIPTION OF THE PREFERRED EMBODIMENTS

In the description of preferred example embodiments of the present invention that follows, elements in the various figures that act in similar ways are given the same or similar indexes, so there is no need for a repeated descriptions of those elements.

Figure 1:
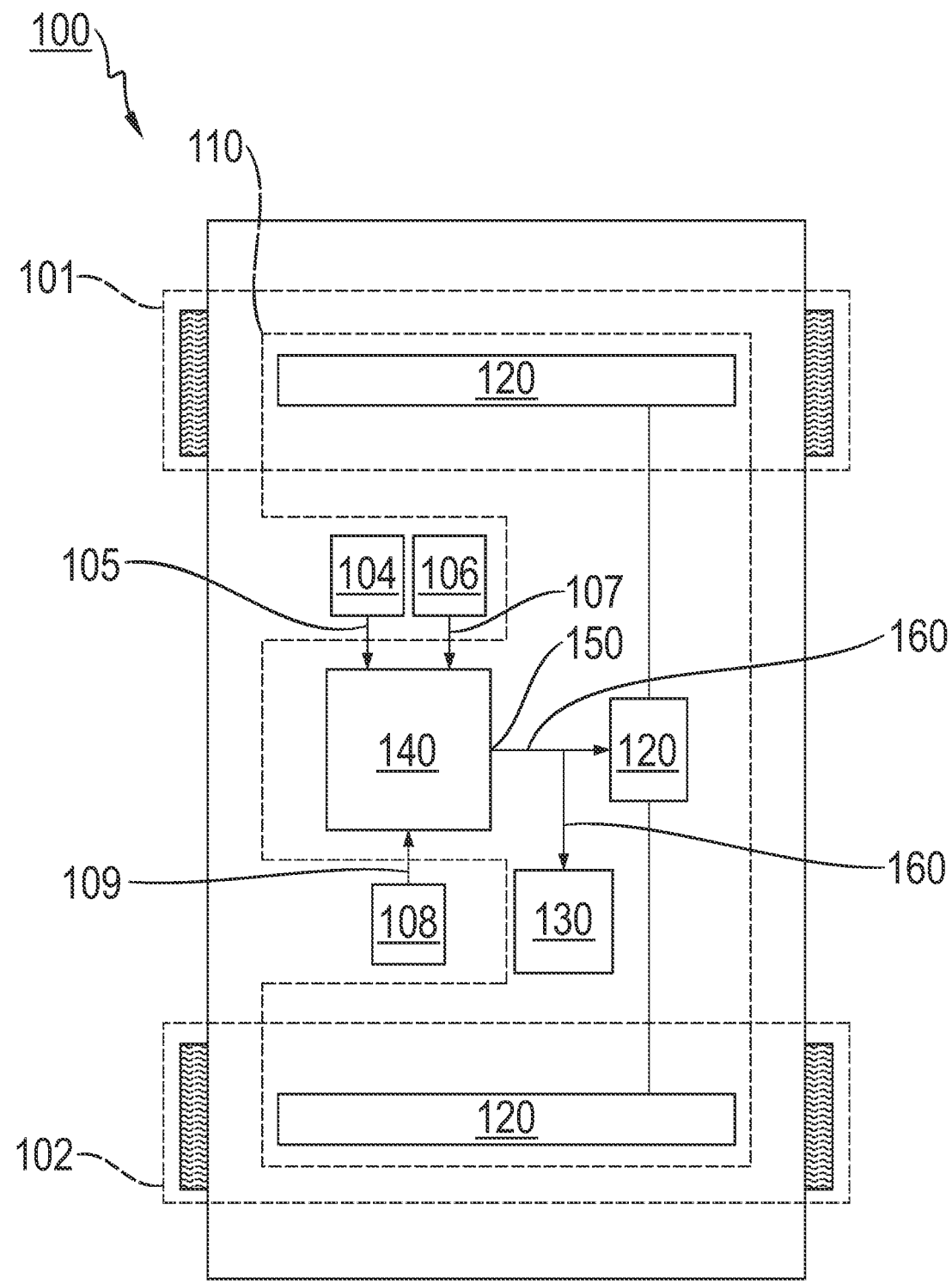
FIG. 1: A schematic representation of a vehicle with a system according to an example embodiment.

FIG. 1 shows a schematic representation of a vehicle 100 with a system 110 for stabilizing the vehicle 100 in accordance with an example embodiment. The vehicle 100 is a motor vehicle for conveying passengers and/or goods, in particular, a passenger car or a utility vehicle. In the vehicle 100, the representation in FIG. 1 shows part of a first axle 101, part of a second axle 102, a first measuring device 104 for measuring a yaw rate of the vehicle 100, a second measuring device 106 for measuring a speed of the vehicle 100 and a detection device 108 for detecting a transverse acceleration of the vehicle 100. The first axle 101 is, for example, a front axle of the vehicle 100. The second axle 102 is, for example, a rear axle of the vehicle 100.

The first measuring device 104 is designed to measure the yaw rate of the vehicle 100 and to generate a first measurement signal 105 that represents the measured yaw rate. The second measurement device 106 is designed to measure the speed of the vehicle 100 and to generate a second measurement signal 107 that represents the measured speed. The detection device 108 is designed to detect the transverse acceleration of the vehicle 100 and to generate a detection signal 109 that represents the detected transverse acceleration.

The vehicle 100 also contains the stabilizing system 110. The system 110 comprises a roll stabilizer 120 and a control unit 140. The roll stabilizer 120 is designed, as a function of a roll torque distribution between the first axle 101 and the second axle 102, to stabilize the first axle 101 and the second axle 102 or to bring about a stabilization of the vehicle 100 in respect of the first axle 101 and the second axle 102. In the example embodiment illustrated here, purely as an example, the roll stabilizer 120 comprises a central unit, an axle unit associated with the first axle 101 and an axle unit associated with the second axle 102.

The control unit 140 is connected with the roll stabilizer 120 for signal transmission purposes. The control unit 140 is designed to control the roll stabilizer 120. More precisely, the control unit 140 is designed, using the first measurement signal 105, the second measurement signal 107 and the detection signal 109, to generate a control signal 160 for controlling the roll stabilizer 120. In this case, the control signal 160 can be transmitted from the control unit 140 to the roll stabilizer 120 via an interface 150. The control signal 160 is appropriate for adjusting the roll torque distribution of the roll stabilizer 120. With reference to the later figures, more details will be given about the control unit 140. For example, the roll stabilizer 120 is designed, using the control signal 160, to adjust the value of the wheel contact forces acting on the wheels of the first axle 101 and the value of the wheel contact forces acting on the wheels of the second axle 102, or designed, using the control signal 160, to adjust a ratio between the wheel contact forces acting on the wheels of the first axle 101 and the wheel contact forces acting on the wheels of the second axle 102.

According to an example embodiment, the system 110 comprises at least one further drive dynamics regulating device 130. The control unit 140 is connected, for signal transmission, with the at least one further drive dynamics regulating device 130. The control signal 160 from the control unit 140 can also be transmitted to the at least one further drive dynamics regulating device 130, via the interface 150. In the representation in FIG. 1, for reasons of space and only as an example, only one further drive dynamics regulating device 130 is shown. The said at least one further drive dynamics regulating device 130 is, for example, in the form of an active damper device, an active suspension device, a steering device for the first axle 101 and/or for the second axle 102, an axle transverse lock, a dynamic all-wheel drive, a switchable coupling rod, an active ball joint and/or the like. The further drive dynamics, regulating device 130 is designed to use the control signal 160 for adjusting at least one operating parameter of the further drive dynamics regulating device 130. For example, the control signal 160 is used to adjust the damping behavior of a first damping device associated with the first axle 101 and the damping behavior of a second damping device associated with the second axle 102, and/or the spring behavior of a first suspension device associated with the first axle 101 and the spring behavior of a second suspension device associated with the second axle 102. In addition or alternatively, according to an example embodiment, the control signal 160 is used to adjust a drive distribution of an all-wheel drive of the vehicle 100 between the first axle 101 and the second axle 102. By virtue of such measures, the drive dynamics of the vehicle 100 can be additionally optimized.

In an example embodiment, the roll stabilizer 120, which is also referred to as the electric or electro-mechanical roll stabilizer (ERC), is designed to displace a roll torque dynamically between the first axle 101 and the second axle 102. Thereby, wheel contact forces, between the wheels of the first axle 101 and the second axle 102, are displaced in a defined manner, so that the yaw behavior of the vehicle 100 can be influenced. For this, the displacement of the wheel contact forces is carried out using the control signal 160.

According to an example embodiment, the transverse acceleration is calculated using the measured yaw rate and the speed of the vehicle for the stabilization of the vehicle 100. Here, the transverse acceleration is calculated as the product of the measured yaw rate and the measured speed. This relation is valid for a steady-state circular trajectory of the vehicle 100, without any sideslip angle. Thus, a discrepancy of the said relation describes the sideslip angle. The said discrepancy is determined by a deviation between the calculated transverse acceleration and the detected transverse acceleration, i.e., for example between a calculated signal described with reference to FIG. 2 and the detected signal 109, and serves as a sideslip angle index. Depending on the sideslip angle index, the roll torque distribution is displaces by a correspondingly generated control signal 160. To stabilize the vehicle 100 in a robust manner, according to an example embodiment, a variation of the control signal 160 follows a so-termed "peak-hold and ramp-down" function. This maintains a peak value for an appropriate period and then falls back to an original value. The peak value can be a fixed specified maximum value or an actually reached maximum value. The original value can be a default value specified for an operating mode of the vehicle 100.

According to an example embodiment, the control signal 160 can also be sent only to the at least one further drive dynamics regulating device 130. In that case, no roll torque distribution is carried out.

Figure 2:
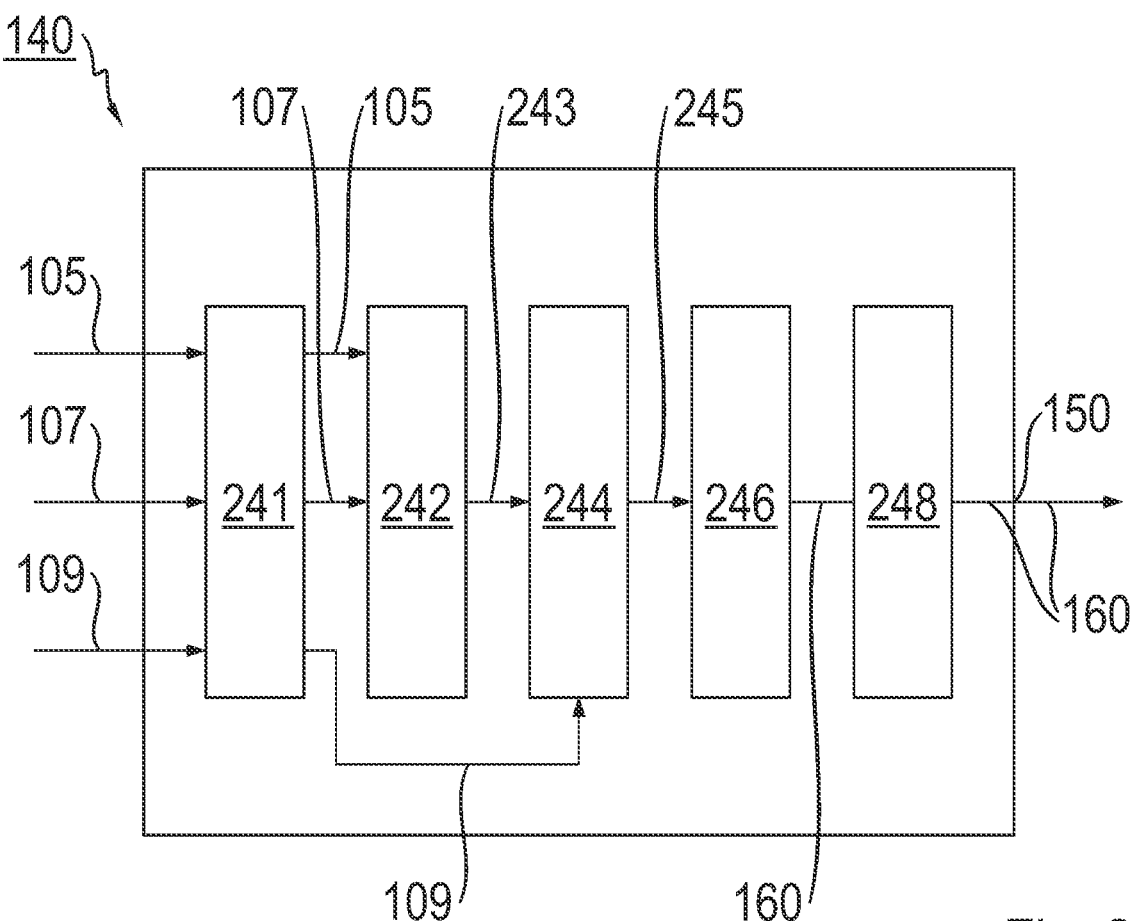
FIG. 2: A schematic representation of the control unit in FIG. 1.

FIG. 2 shows a schematic representation of the control unit 140, in FIG. 1, according to an example embodiment. In particular, the control unit 140 is designed to carry out the method described with reference to FIG. 3 or a similar method. The control unit 140 has a determining device 244 and a generating device 246. According to the example embodiment illustrated here, the control unit 140 optionally also has a reading-in device 241, a calculating device 242 and an output device 248.

The reading-in device 241 is designed to read in the detection signal 109 that represents the transverse acceleration of the vehicle from the detection device. The reading-in device 241 is also designed to read in the first measurement signal 105 that represents the measured yaw rate of the vehicle and the second measurement signal 107 that represents the measured speed of the vehicle. In addition, the reading-in device 214 is designed to pass on the first measurement signal 105 and the second measurement signal 107 to the calculating device 242. Moreover, the reading-in device 214 is designed to pass on the detection signal 109 to the determining device 244.

The calculating device 242 is designed, using the first measurement signal 105 and the second measurement signal 107 and a calculation protocol, to generate a calculation signal 243 that represents the calculated transverse acceleration of the vehicle. Otherwise expressed, the calculating device 242 is designed to calculate the transverse acceleration of the vehicle as the product of the measured yaw rate of the vehicle and the measured speed of the vehicle, in order to obtain the calculated transverse acceleration represented by the calculated signal 243.

The calculated transverse acceleration represents a reference transverse acceleration during a steady-state circular trajectory without the occurrence of any sideslip angle. The calculating device 242 is also designed to pass the calculated signal 243 on to the determining device 244.

The determining device 244 is designed, using the detection signal 109 and the calculation signal 243 as well as a determination protocol, to determine a sideslip angle index 245. Otherwise expressed, the determining device 244 is designed to determine the sideslip angle index 245 from a difference between a transverse acceleration of the vehicle calculated from a deviation between a yaw rate of the vehicle and a speed of the vehicle, and a detected transverse acceleration of the vehicle. The sideslip angle index 245 stands in a relationship, in particular a known or defined relationship, with a sideslip angle of the vehicle. The determining device 244 is designed to send the sideslip angle index 245 to the generating device 246 or to prepare it for sending thereto.

The generating device 246 is designed, using the sideslip angle index 245, to generate the control signal 160. The control signal 160 is suitable for adjusting the roll torque distribution of the roll stabilizer as a function of the determined sideslip angle index 245. The generating device 246 is also designed to pass the control signal 160 onto the output device 248.

The output device 248 is designed to prepare the control signal 160 for output to the interface 150 with the roll stabilizer or with the at least one further driving dynamics regulating device. Thus, the control signal 160 can be used in the roll stabilizer to adjust the roll torque distribution to be brought about by the roll stabilizer. In addition or alternatively, the control signal can be used by the further driving dynamics regulating device to adjust at least one driving dynamics regulation parameter to be carried out by the further driving dynamics regulating device.

Figure 3:
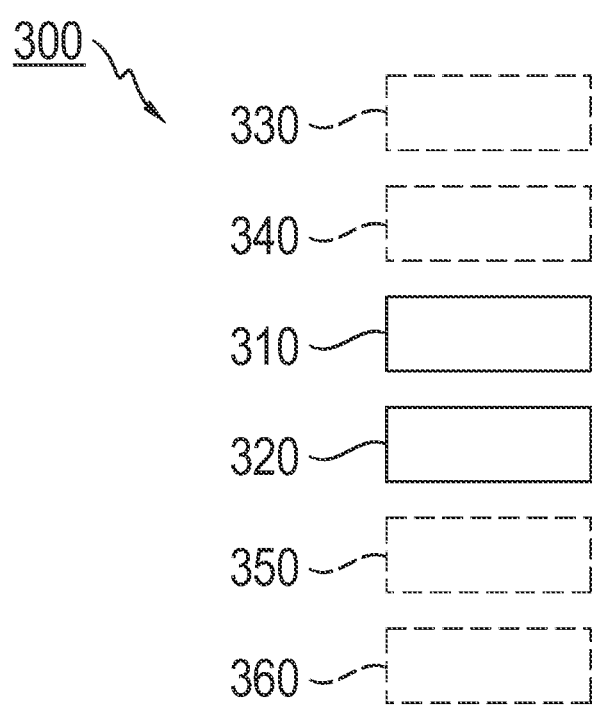
FIG. 3: A flow chart of a method for stabilizing, in accordance with an example embodiment.

FIG. 3 shows a flow chart of a stabilizing method 300, according to an example embodiment. The method 300 can be carried out in order to stabilize a vehicle. In this case, the stabilization method 300 can be carried out in combination with a roll stabilizer designed to stabilize a first axle and a second axle of the vehicle as a function of a roll torque distribution between the said first and second axles. The stabilizing method 300 can be carried out using the control unit in one of the above-described figures or a similar control unit.

The stabilizing method 300 comprises a step 310 of determining a sideslip angle index from a deviation between a transverse acceleration of the vehicle, calculated from a yaw rate of the vehicle and a speed of the vehicle, and a detected transverse acceleration of the vehicle. In this, the sideslip angle index is related to a sideslip angle of the vehicle. According to an example embodiment, in the determination step 310, a sideslip angle index is determined, which corresponds to the sideslip angle index and/or which corresponds to a time variation of the sideslip angle and/or which is a variable derived from the sideslip angle.

The stabilizing method 300 also comprises a step 320 of generating a control signal, using the determined sideslip angle index from the determining step 310. The control signal is suitable for adjusting the roll torque distribution of the roll stabilizer as a function of the determined sideslip angle index. In an example embodiment, the control signal produced in the generating step 320 is suitable for adjusting a variation of the roll torque distribution in such a manner that, starting from a default value, the variation increases to a maximum value which is held for an adjustable period, and which then decreases back to the default value.

According to an example embodiment, the stabilizing method 300 also comprises a reading-in step 330 and/or a calculation step 340 and/or an output step 350. In this, the reading-in step 330 and the calculation step 340 can be carried out before the determination step 310. The output step 350 can be carried out after the generation step 320.

In the reading-in step 330, the transverse acceleration of the vehicle is read in from a detection device in order to provide the detected transverse acceleration. Optionally, in the reading-in step 330, a measured yaw rate of the vehicle and a measured speed of the vehicle are also read in from measurement devices in the vehicle.

In the calculation step 340, the transverse acceleration of the vehicle is calculated as the product of a measured yaw rate of the vehicle and a measured speed of the vehicle in order to obtain the calculated transverse acceleration. Here, the calculated transverse acceleration represents a reference transverse acceleration during a steady-state circular trajectory without the occurrence of a sideslip angle.

In the output step 350, the control signal produced in the generating step 320 is sent for output to an interface with the roll stabilizer and in addition or alternatively with at least one further driving dynamics regulating device. The at least one further driving dynamics regulating device is an active damper device, an active suspension device, a steering device for the first axle and/or the second axle, an axle transverse lock, a dynamic all-wheel drive, a switchable coupling rod, an active ball joint and/or the like.

In an optional step 360, the control signal is used for regulating the driving dynamics of the vehicle. According to an example embodiment, the control signal is used by the roll stabilizer to adjust the roll torque distribution. In addition or alternatively, the control signal is used by the at least one further driving dynamics regulating device to adjust at least one parameter of the at least one further driving dynamics regulating device.

When an example embodiment contains an "and/or" link between a first feature and a second feature, then this can be read to mean that the example embodiment in one form allows both the first and the second feature, and, in another form, allows either only the first feature or only the second feature.

INDEXES

100 Vehicle
101 First axle
102 Second axle
104 First measuring device
105 First measurement signal
106 Second measuring device
107 Second measurement signal
108 Detection device
109 Detection signal
110 Stabilization system
120 Roll stabilizer
130 Further driving dynamics regulating device
140 Control unit
150 Interface
160 Control signal
241 Reading-in device
242 Calculation device
243 Calculation signal
244 Determination device
245 Sideslip angle index
246 Generating device
248 Output device
300 Stabilization method
310 Determination step
320 Generating step
330 Reading-in step
340 Calculation step
350 Output step
360 Application step

The invention claimed is:

1. A method for stabilizing a vehicle, wherein the vehicle comprises a roll stabilizer which is configured to stabilize a first axle and a second axle of the vehicle as a function of a roll torque distribution between the first axle and the second axle, and the method comprising:
   a determination step of determining a sideslip angle index from a difference between a calculated transverse acceleration, which is calculated from a measured yaw rate of the vehicle and a measured speed of the vehicle, and a detected transverse acceleration of the vehicle, and the sideslip angle index is related to a sideslip angle of the vehicle, and
   a generating step of generating a control signal using the sideslip angle index, and the roll torque distribution of the roll stabilizer is adjusted, by the control signal, directly as a function of the determined sideslip angle index.

2. The method according to claim 1, wherein the control signal produced during the generating step is transmitted to the roll stabilizer to adjust a time variation of the roll torque distribution.

3. The method according to claim 2, wherein the time variation of the roll torque distribution is adjusted by the roll stabilizer based on the control signal such that, starting from a default value, the time variation increases to a maximum value which is maintained for an adjustable period and then falls back to the default value.

4. The method according to claim 1, wherein the sideslip angle index, which corresponds to the sideslip angle and/or to a time variation of the sideslip angle and/or to a variable derived from the sideslip angle, is determined during the determination step.

5. The method according to claim 1, further comprising an output step of providing the control signal for output to an interface with the roll stabilizer or to the roll stabilizer and at least one further driving dynamics regulating device, and
   the at least one further driving dynamics regulating device is an active damper device, an active suspension device, a steering device for the first axle and/or the second axle, an axle transverse lock, a dynamic all-wheel drive, a switchable coupling rod, and an active ball joint.

6. The method according to claim 1, further comprising a calculation step in which the calculated transverse acceleration of the vehicle is calculated as a product of the measured yaw rate of the vehicle and the measured speed of the vehicle, in order to provide the calculated transverse acceleration, and
   the calculated transverse acceleration represents a reference transverse acceleration during a steady-state circular trajectory in which a transverse acceleration, without any sideslip angle, occurs.

7. The method according to claim 1, further comprising reading-in the detected transverse acceleration of the vehicle from a transverse acceleration sensor, in order to provide the detected transverse acceleration.

8. A control unit, which is designed to carry out and/or control the steps of the method according to claim 1.

9. A system for stabilizing a vehicle, wherein the system comprises a roll stabilizer designed to stabilize a first axle and a second axle of the vehicle as a function of a roll torque distribution between the first axle and the second axle, and the control unit according to claim 8, wherein the control unit is connectable to the roll stabilizer for signal transmission purposes.

10. The system according to claim 9, further comprising at least one further driving dynamics regulating device,
   the control unit is connectable to the at least one further driving dynamics regulating device, and
   the at least one further driving dynamics regulating device is one of: an active damper device, an active suspension device, a steering device for the first axle and/or the second axle, an axle transverse lock, a dynamic all-wheel drive, a switchable coupling rod, and an active ball joint.

* * * * *